Nov. 11, 1941.    M. A. KENDALL    2,262,325
SELF-ALIGNING RETURN ROLLER FOR BELT CONVEYERS
Filed July 29, 1940    2 Sheets-Sheet 1
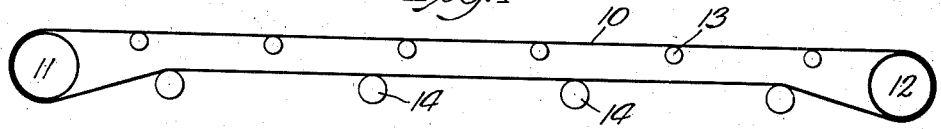
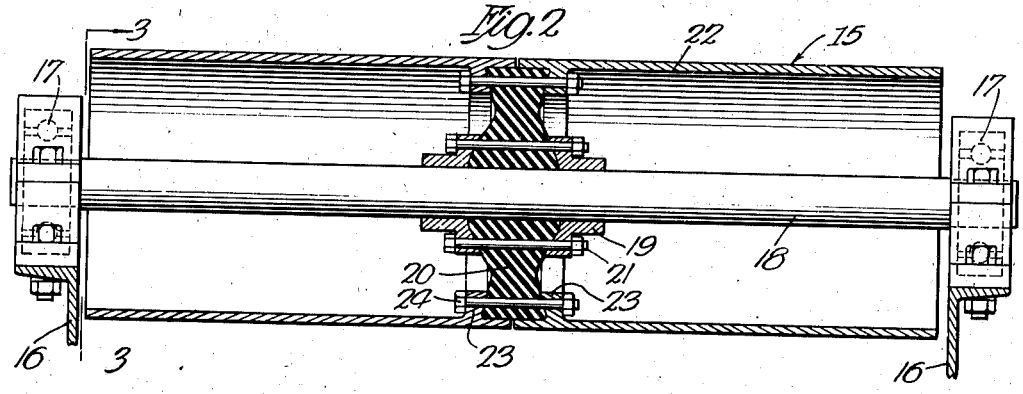
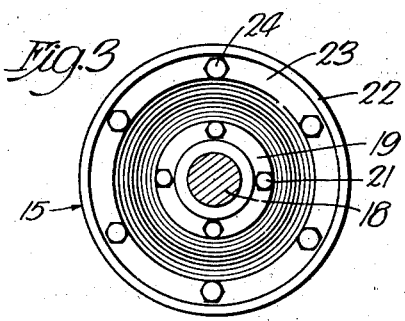
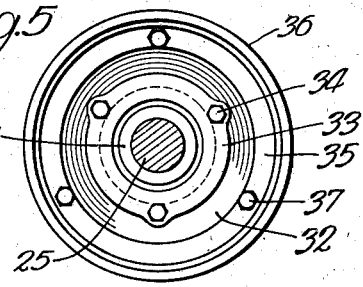
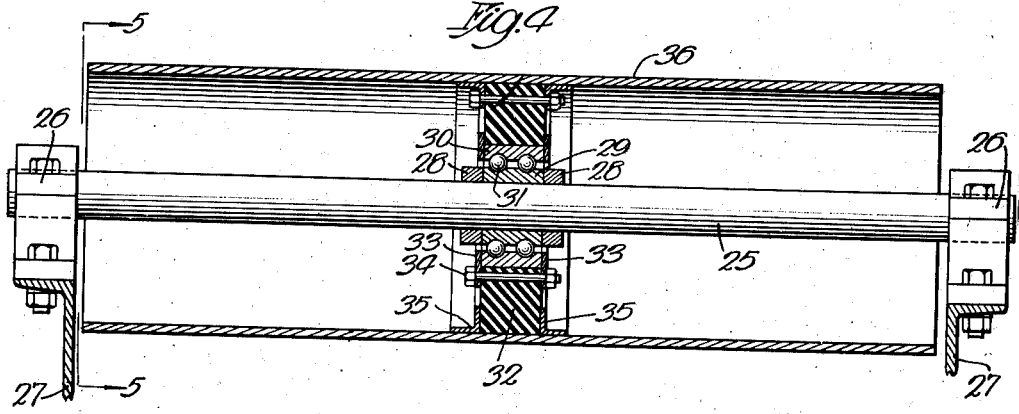
INVENTOR.
Myron A. Kendall
BY Mann, Brown & Co.
ATTYS.

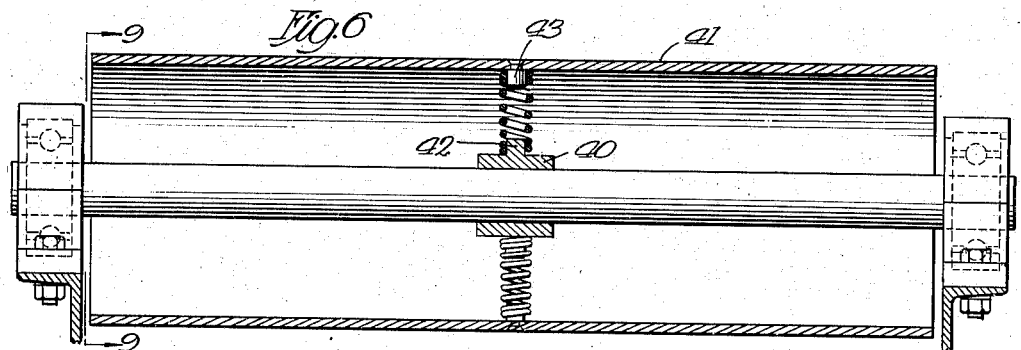
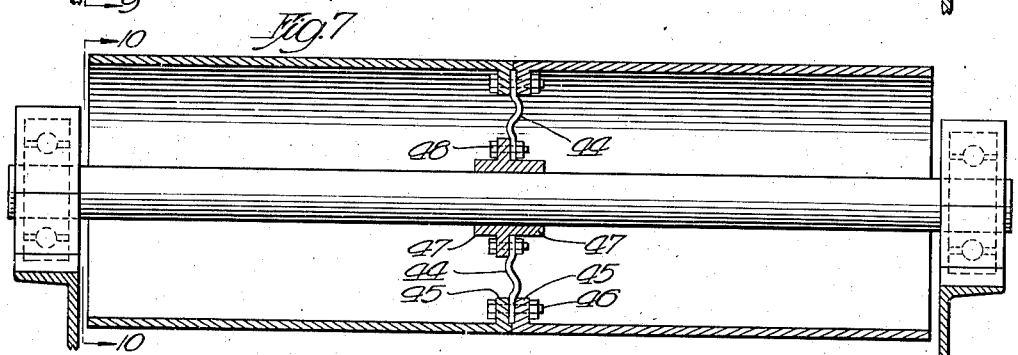
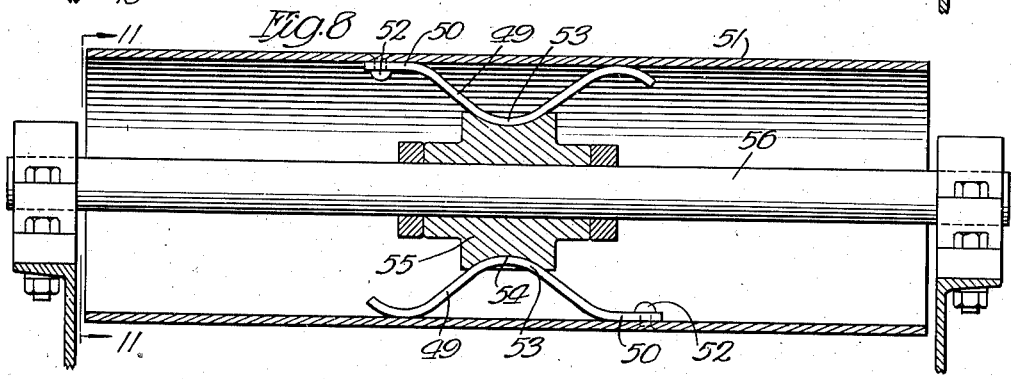
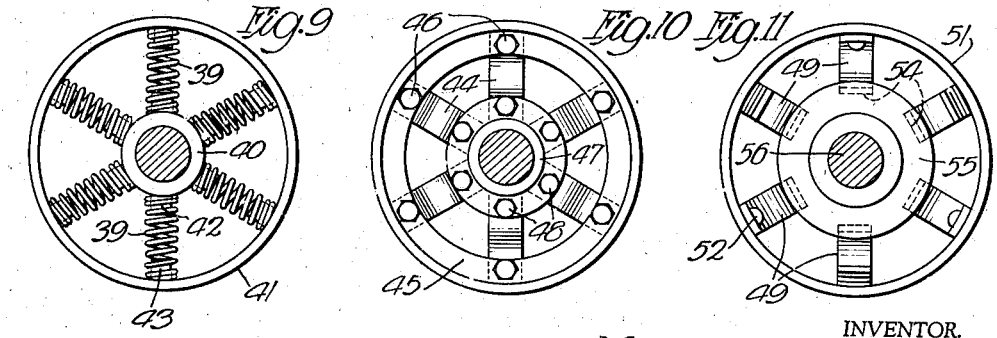

Patented Nov. 11, 1941

2,262,325

UNITED STATES PATENT OFFICE 2,262,325

SELF-ALIGNING RETURN ROLLER FOR BELT CONVEYERS

Myron A. Kendall, Aurora, Ill., assignor to Stephens-Adamson Manufacturing Company, a corporation of Illinois Application July 29, 1940, Serial No. 348,182

8 Claims. (Cl. 198—202)

This invention relates to belt conveyers and particularly to the return rollers or pulleys for supporting the return run of the belt. Commonly, they are flat faced pulleys mounted on straight shafts and have no inherent action to correct the usual tendency of the belt to run to one side or the other.

The principal object of the invention is to provide limited universal movement of the tube forming the rim of the pulley relative to the shaft so that the friction of the belt will automatically skew the tube or rim slightly and make it train the belt back into line. Preferably the universal movement is yieldingly resisted by resilient means that will return the rim to normal position when the friction of the belt permits.

Generally speaking, this is accomplished by mounting the tube on a rubber disk or other resilient web structure fixed to or journaled on the shaft in a medial position whereby the tube is normally centered on the shaft but will be skewed automatically by excess of friction on one side of the center of support on the disc or web.

Selected embodiments are illustrated somewhat diagrammatically in the accompanying drawings in which Fig. 1 is a diagram of a belt conveyer;

Fig. 2 is a longitudinal section through one form of return roller;

Fig. 3 is a transverse section on the line 3—3 of Fig. 2;

Fig. 4 is a longitudinal section through another form of return roller;

Fig. 5 is a transverse section on the line 5—5 of Fig. 4;

Figs. 6, 7 and 8 are longitudinal sections through other forms of return rollers, and Figs. 9, 10 and 11 are transverse sections on the lines 9—9, 10—10 and 11—11, respectively.

But these illustrations and the corresponding description are intended for the purpose of an illustrative disclosure only and are not intended to impose unnecessary limitations on the claims.

In the simple diagram shown in Fig. 1, a belt conveyer 10 is trained about a head pulley 11 and a tail pulley 12 with the load carrying run supported on rollers 13 and the return run on rollers 14. The supports for the return rollers, as well as the various other features of belt conveyers, are known in numerous forms and are a matter of choice.

In Fig. 2 the return roller, generally indicated by 15, is supported on the frame work including channels 16 equipped with ball bearings 17, in which the ends of a shaft 18 are journaled. In the medial portion of the shaft there are two hub flanges 19, fitted and fixed thereon in any suitable manner and clamping between them the inner portion of a rubber disc 20, through which fastening bolts 21 pass. The rim 22 of the roller is made in two cylindrical parts, having corresponding tapered internal flanges 23, gripping the outer portion of the disc 20 and secured to it by bolts 24. The shape and character of the disc 20 is so much a matter of choice that little may be said concerning it. The waist-shaped section along the radius lends itself to the type of clamping action shown, the rubber should be what is known as soft, having less than ten percent of sulphur, but the degree of softness necessarily will depend on the size and relative proportion of the parts.

In the form shown in Fig. 4, the ends of the shaft 25 are mounted in pillow blocks 26 on channels 27 and the intermediate portion is equipped with collars 28, fixed to the shaft and gripping an internal race 29, cooperating with an external race 30 to form with the balls 31 a double ball bearing. The race 30 is clamped to the inner portion of a rubber disc 32 by rings 33 and bolts 34. The outer portion of the disc 32 is clamped between flanged rings 35, secured to the inner wall of the tube 36 and made fast to the disc by bolts 37.

In Figs. 6 and 9 the web structure includes a plurality of radially arranged helical springs 39 extending between an intermediately placed hub 40 and the medial portion of the tube 41. They are shown in a form suitable for compression springs with their ends telescoped over studs 42 on the hub and 43 riveted to the interior of the tube. Some will prefer to make them tension springs and secure them in suitable manner, as by providing the ends with appropriate eyes to be bolted to the hub and rim.

In Figs. 7 and 10 the web structure takes the form of leaf spring spokes 44, having the outer ends clamped between the rim flanges 45 by the bolts 46 and the inner ends fastened to the hub 47, by bolts 48. Some will prefer to use a spring disc instead of separate spokes.

In Figs. 8 and 11, the web structure is made up of springs 49, of a shape corresponding to a little more than one cycle of a sine curve, having one end 50 secured to the tube 51 by rivets 52 and the intermediate portion 53 seated in a corresponding slot 54 in a hub 55, secured to the shaft 56.

In all of these forms the normal tendency of the rim or tube of the roller is to assume a position coaxial with the shaft upon which it is mounted. However, the web structure allows it a limited universal movement about intermediate axes by virtue of which any difference in friction at the opposite sides of the roller will cause the tube to be skewed and thus train the belt back towards the proper aligned position.

The resilient feature is desirable but not absolutely necessary.

I claim:

1. In a self-training return roller for belt conveyers, an outer belt supporting tube having a substantially rigid peripheral portion, an inner rotatable rigid shaft, and a resilient connection between the shaft and the tube at their central portions only, said connection being resiliently yieldable in a direction longitudinally of the shaft and transversely thereto.

2. In a self-training return roller for belt conveyers, an outer belt supporting rigid tube, an inner rotatable rigid support, and a resilient web structure, substantially intermediate between the ends of the tube, mounting the tube on the support for a limited movement both longitudinally of, and transversely to, the support.

3. In a self-training return roller for belt conveyers, an outer belt supporting tube, an inner rotatable substantially rigid support, and a soft rubber web structure, at the central portion of the tube, mounting the tube on the support for yielding universal movement and constituting the sole means for supporting said tube from said support.

4. In a return roller for belt conveyers, a shaft, means to support the end portions of the shaft, a belt supporting tube, and a single, resilient, universal joint connection between the shaft and tube to cause the same to rotate together and constituting the sole means for supporting said tube from said shaft.

5. A self-training return roller for belt conveyers comprising an outer rotating belt supporting member, an elongated rigid support extending axially through said member, and means including resilient elements at the central portion only of said belt supporting member for mounting said member on said support for universal movement and for yieldingly biasing said member to a position coaxial with said support, said means constituting the sole support for said belt supporting member.

6. In a self-training return roller for belt conveyers, an outer belt supporting tubular member comprising two alined sections, said sections having inwardly extending flanges adjacent their inner ends, a rubber disc having an axial opening therethrough, means for clamping the outer portion of said disc between said flanges for causing said disc and tubular sections to turn together, an elongated support extending axially through said disc and tubular member, and means for clamping the central portion of said disc to said support for causing said disc and shaft to rotate together.

7. In a self-training return roller assembly for belt conveyers, a hollow roller, a shaft extending axially through said roller, a resilient universal connection between the central portion only of said roller and said shaft, and spring means constituting a universal connection between said shaft and the central portion only of said roller for constituting the sole support for said roller from said shaft and for biasing the same to a position coaxial with said shaft.

8. In a self-training return roller assembly for belt conveyers, a hollow roller, a shaft extending axially through said roller, a ball bearing assembly fixed on said shaft midway of said roller, and an annulus of soft rubber forming a universal connection between said assembly and roller and constituting the sole means for supporting said hollow roller.

MYRON A. KENDALL.